US012783077B2

(12) United States Patent
Sosanya et al.

(10) Patent No.: US 12,783,077 B2
(45) **Date of Patent: *Nov. 3, 2026**

(54) SYSTEMS AND METHODS FOR DYNAMIC SHAPE SKETCHING USING POSITION INDICATOR AND PROCESSING DEVICE THAT DISPLAYS VISUALIZATION DATA BASED ON POSITION OF POSITION INDICATOR

(71) Applicant: Wacom Co., Ltd., Saitama (JP)

(72) Inventors: Oluwaseyi Sosanya, London (GB); Daniela Paredes-Fuentes, London (GB); Daniel Thomas, London (GB)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/325,309

(22) Filed: Sep. 10, 2025

(65) Prior Publication Data

US 2026/0010255 A1 Jan. 8, 2026

Related U.S. Application Data

(63) Continuation of application No. 18/653,635, filed on May 2, 2024, now Pat. No. 12,524,101, which is a (Continued)

(51) Int. Cl.
*G06F 3/041* (2006.01)
*G06F 3/0346* (2013.01)
(Continued)

(52) U.S. Cl.
CPC ........ *G06F 3/04162* (2019.05); *G06F 3/0346* (2013.01); *G06F 3/03545* (2013.01);
(Continued)

(58) Field of Classification Search
CPC .................................................. G06F 3/04162
See application file for complete search history.

(56) References Cited

U.S. PATENT DOCUMENTS 6,474,888 B1 * 11/2002 Lapstun ............... B41J 2/17553 178/79
7,639,250 B2 12/2009 Xu et al.
(Continued)

FOREIGN PATENT DOCUMENTS

WO 2019220803 A1 11/2019

OTHER PUBLICATIONS

Extended European Search Report dated Feb. 5, 2024, for the corresponding European Patent Application No. 21833751.7, 13 pages.

(Continued)

*Primary Examiner* — Chun-Nan Lin
(74) *Attorney, Agent, or Firm* — Seed Intellectual Property Law Group LLP

(57) ABSTRACT

A method for displaying a three-dimensional object based on user operation of a position indicator. The method includes defining a two-dimensional shape based on movement of a tip of the position indicator on an input surface; determining a direction in which the two-dimensional shape extends, based on at least one of a pressure applied to the input surface by the position indicator or an acceleration of the position indicator; generating a representation of a three-dimensional object extruded from the two-dimensional shape in the direction in which the two-dimensional shape is determined to extend; and displaying the three-dimensional object on a display.

7 Claims, 6 Drawing Sheets

Related U.S. Application Data continuation of application No. 18/148,334, filed on Dec. 29, 2022, now Pat. No. 12,001,629, which is a continuation of application No. PCT/IB2021/055649, filed on Jun. 25, 2021, which is a continuation of application No. 16/918,939, filed on Jul. 1, 2020, now abandoned.

(51) Int. Cl.

| | |
|---|---|
| ***G06F 3/0354*** | (2013.01) |
| ***G06F 3/038*** | (2013.01) |
| ***G06T 15/02*** | (2011.01) |

(52) U.S. Cl.

CPC .......... *G06F 3/0383* (2013.01); *G06F 3/0414* (2013.01); *G06T 15/02* (2013.01); *G06F 2203/04101* (2013.01)

(56) References Cited

U.S. PATENT DOCUMENTS

| | | | | |
|---|---|---|---|---|
| 8,982,147 | B2 | 3/2015 | Ramani et al. | |
| 9,600,096 | B2 | 3/2017 | Katsurahira et al. | |
| 9,939,931 | B2 | 4/2018 | Fujitsuka | |
| 9,964,395 | B2 | 5/2018 | Yamada | |
| 10,049,493 | B1 * | 8/2018 | Verizzo | G06T 17/20 |
| 2006/0038797 | A1 * | 2/2006 | Lapstun | B43K 8/006 345/173 |
| 2008/0225007 | A1 | 9/2008 | Nakadaira et al. | |
| 2012/0206452 | A1 | 8/2012 | Geisner et al. | |
| 2014/0152586 | A1 | 6/2014 | Terunuma | |
| 2016/0343174 | A1 | 11/2016 | Fuentes et al. | |
| 2016/0378217 | A1 | 12/2016 | Kim et al. | |
| 2018/0173333 | A1 | 6/2018 | Maruoka | |
| 2019/0083006 | A1 | 3/2019 | Jagannathan et al. | |
| 2019/0094996 | A1 | 3/2019 | Kim | |
| 2019/0096129 | A1 * | 3/2019 | Rhodes | G06F 3/011 |
| 2019/0243526 | A1 | 8/2019 | Frank et al. | |
| 2019/0294288 | A1 | 9/2019 | Kim et al. | |
| 2019/0369752 | A1 | 12/2019 | Ikeda et al. | |
| 2020/0042111 | A1 | 2/2020 | Connellan et al. | |
| 2020/0122405 | A1 * | 4/2020 | Bigos | H04B 5/20 |
| 2020/0143699 | A1 | 5/2020 | Pashayev et al. | |
| 2021/0048897 | A1 | 2/2021 | Munakata et al. | |
| 2022/0004299 | A1 | 1/2022 | Sosanya et al. | |

OTHER PUBLICATIONS

International Search Report, mailed Aug. 31, 2021, for International Application No. PCT/IB2021/055649. (3 pages).

Kwan et al., "Mobi3DSketch: 3D Sketching in Mobile AR," CHI 2019, May 4-9, 2019, Glasgow, Scotland, UK, 11 pages.

* cited by examiner

SYSTEMS AND METHODS FOR DYNAMIC SHAPE SKETCHING USING POSITION INDICATOR AND PROCESSING DEVICE THAT DISPLAYS VISUALIZATION DATA BASED ON POSITION OF POSITION INDICATOR

BACKGROUND

Technical Field

The present disclosure relates to specifying dimensions of multidimensional objects represented in digital data, and more particularly to systems and methods for dynamically sketching shapes of such multidimensional objects based on intuitive user operations performed with a position indicator as an input device.

Description of the Related Art

Conventionally, a user must perform a complex set of operations with multiple input devices in order to specify dimensions of multidimensional objects represented in digital data. For example, a conventional system that enables users to specify shapes of multidimensional objects represented in digital data may require a user to operate one or more keys of a keyboard with one of the user's hands while simultaneously moving and operating a button of a computer mouse with the other of the user's hands in order to specify shapes, orientations, dimensions, etc. Accordingly, it is desirable to provide systems and methods that enable users to intuitively specify shapes, orientations, dimensions, etc. of multidimensional objects represented in digital data with a single input device.

BRIEF SUMMARY

The present disclosure teaches systems and methods that enable users to intuitively and dynamically specify shapes, orientations, dimensions, etc. of multidimensional objects represented in digital data with a single input device.

A system according to a first embodiment of the present disclosure may be summarized as including a position indicator that includes: a case having a plurality of reference tags disposed on an exterior surface of the case; a core body disposed within the case and having a tip that protrudes from the case through an opening in the case; a pressure detector which, in operation, detects a pressure applied to the tip of the core body; and a transmitter coupled to the pressure detector, wherein the transmitter, in operation, transmits one or more signals indicative of the pressure applied to the tip of the core body; and a processing device that includes: at least one receiver which, in operation, receives the one or more signals indicative of the pressure applied to the tip of the core body of the position indicator and one or more signals indicative of one or more respective positions of the one or more of the reference tags; at least one processor coupled to the at least one receiver; at least one memory device that stores instructions which, when executed by the at least one processor, cause the processing device to generate visualization data based on the one or more signals indicative of the pressure applied to the tip of the core body of the position indicator and the one or more signals indicative of one or more respective positions of the one or more of the reference tags, wherein the visualization data describe an object that extends from a predetermined position in a direction that is based on the one or more signals indicative of the pressure applied to the tip of the core body of the position indicator, and wherein the visualization data are provided for display by a visualization device.

When the one or more signals indicative of the pressure applied to the tip of the core body of the position indicator indicate that the pressure is greater than a predetermined threshold value, the instructions stored by the at least one memory device, when executed by the at least one processor, may cause the processing device to generate the visualization data such that the object, when displayed by the visualization device, extends from the predetermined position in a first predetermined direction.

When the one or more signals indicative of the pressure applied to the tip of the core body of the position indicator indicate that the pressure is less than the predetermined threshold value, the instructions stored by the at least one memory device, when executed by the at least one processor, may cause the processing device to generate the visualization data such that the object, when displayed by the visualization device, extends from the predetermined position in a second predetermined direction, the second predetermined direction being opposite the first predetermined direction.

The processing device may include a sensor having an input surface, the sensor, in operation, may detect the position indicator and output a signal indicative of a position on the input surface of the position indicator as sensed by the sensor, and the instructions stored by the at least one memory device, when executed by the at least one processor, may cause the processing device to generate the visualization data based on the one or more signals indicative of the pressure applied to the tip of the core body of the position indicator, the one or more signals indicative of one or more respective positions of the one or more of the reference tags, and the signal indicative of the position on the input surface of the position indicator as sensed by the sensor.

The position indicator may include a switch that, in operation, is in one of a plurality of positions; the one or more signals transmitted by the transmitter may be indicative of the pressure applied to the tip of the core body and a position of the switch; and the instructions stored by the at least one memory device, when executed by the at least one processor, may cause the processing device to generate the visualization data based on the one or more signals indicative of the pressure applied to the tip of the core body of the position indicator and the position of the switch, and the one or more signals indicative of one or more respective positions of the one or more of the reference tags.

The position indicator may include an accelerometer that, in operation, outputs a signal indicative of an acceleration of the position indicator; the one or more signals transmitted by the transmitter may be indicative of the pressure applied to the tip of the core body and the acceleration of the position indicator; and the instructions stored by the at least one memory device, when executed by the at least one processor, may cause the processing device to generate the visualization data based on the one or more signals indicative of the pressure applied to the tip of the core body of the position indicator and the acceleration of the processing device, and the one or more signals indicative of one or more respective positions of the one or more of the reference tags.

A system according to a second embodiment of the present disclosure may be summarized as including a position indicator that includes: a case having a core body disposed within the case and having a tip that protrudes from the case through an opening in the case; a pressure detector which, in operation, detects a pressure applied to the tip of the core body; and a transmitter coupled to the pressure detector, wherein the transmitter, in operation, transmits one or more signals indicative of the pressure applied to the tip of the core body that is detected by the pressure detector; and a processing device that includes: a sensor having an input surface, wherein the sensor, in operation, detects the position indicator and outputs a signal indicative of a position of the tip of the core body with respect to the input surface of the sensor; at least one receiver which, in operation, receives the one or more signals indicative of the pressure applied to the tip of the core body of the position indicator; at least one processor coupled to the sensor and the at least one receiver; at least one memory device that stores instructions which, when executed by the at least one processor, cause the processing device to the generate visualization data based on the signal indicative of the position on the input surface of the tip of the core body of the position indicator, and the one or more signals indicative of the pressure applied to the tip of the core body of the position indicator, wherein the visualization data describe an object that extends from a predetermined position in a direction that is based on the one or more signals indicative of the pressure applied to the tip of the core body of the position indicator, and wherein the visualization data are provided for display by a visualization device.

When the one or more signals indicative of the pressure applied to the tip of the core body of the position indicator indicate that the pressure is greater than a predetermined threshold value, the instructions stored by the at least one memory device, when executed by the at least one processor, may cause the processing device to generate the visualization data such that the object, when displayed by the visualization device, extends from the predetermined position in a first predetermined direction.

When the one or more signals indicative of the pressure applied to the tip of the core body of the position indicator indicate that the pressure is less than the predetermined threshold value, the instructions stored by the at least one memory device, when executed by the at least one processor, may cause the processing to generate the visualization data such that the object, when displayed by the visualization device, extends from the predetermined position in a second predetermined direction, the second predetermined direction being opposite the first predetermined direction.

The processing device may include a switch that, in operation, is in one of a plurality of positions; the one or more signals transmitted by the transmitter may be indicative of the pressure applied to the tip of the core body and a position of the switch; and the instructions stored by the at least one memory device, when executed by the at least one processor, may cause the processing device to generate the visualization data based on the signal indicative of the position of the tip of the core body with respect to the input surface of the sensor, and the one or more signals indicative of the pressure applied to the tip of the core body of the position indicator and the position of the switch.

The processing device may include an accelerometer that, in operation, outputs a signal indicative of an acceleration of the processing device; the one or more signals transmitted by the transmitter may be indicative of the pressure applied to the tip of the core body and the acceleration of the processing device; and the instructions stored by the at least one memory device, when executed by the at least one processor, may cause the processing device to generate the visualization data based on the signal indicative of the position of the tip of the core body with respect to the input surface of the sensor, the one or more signals indicative of the pressure applied to the tip of the core body of the position indicator, and the acceleration of the processing device.

A method according to a third embodiment of the present disclosure may be summarized as including: receiving one or more signals indicative of one or more spatial positions of a position indicator in a three-dimensional space relative to a surface of a sensor; receiving a signal indicative of a pressure applied to a tip of a core body of the position indicator; generating visualization data based on the one or more signals indicative of one or more positions of the position indicator and the signal indicative of the pressure applied to the tip of the core body of the position indicator, wherein the visualization data describe an object that, when displayed, extends in a direction away from a plane of the surface of the sensor based on the signal indicative of the pressure applied to the tip of the core body of the position indicator; and providing the visualization data for display.

When the signal indicative of the pressure applied to the tip of the core body of the position indicator indicates that the pressure is greater than a predetermined threshold value, the object may extend from a predetermined position in a first predetermined direction.

When the signal indicative of the pressure applied to the tip of the core body of the position indicator indicates that the pressure is less than the predetermined threshold value, the object may extend from the predetermined position in a second predetermined direction, the second predetermined direction being opposite the first predetermined direction.

The method may further include: receiving a signal indicative of a position of a switch of the position indicator, wherein the generating of the visualization data includes generating the visualization data based on (i) the signal indicative of the pressure applied to the tip of the core body of the position indicator, (ii) the one or more signals indicative of one or more spatial positions of the position indicator, and (iii) the signal indicative of the position of the switch of the position indicator.

The method may further include: receiving a signal indicative of an acceleration of the position indicator, wherein the generating of the visualization data includes generating the visualization data based on (i) the signal indicative of the pressure applied to the tip of the core body of the position indicator, (ii) the one or more signals indicative of one or more spatial positions of the position indicator, and (iii) the signal indicative of the acceleration of the position indicator.

The one or more signals indicative of one or more spatial positions of the position indicator may include one or more signals indicative of one or more respective positions of one or more of a plurality of reference tags disposed on the position indicator.

The one or more signals indicative of one or more spatial positions of the position may indicator include a signal indicative of a position of the tip of the position indicator with respect to the surface of the sensor.

The method may further include: displaying a representation of the object based on the visualization data. The representation of the object may be displayed, at least in part, by a head-mounted display.

DETAILED DESCRIPTION

Figure 1:
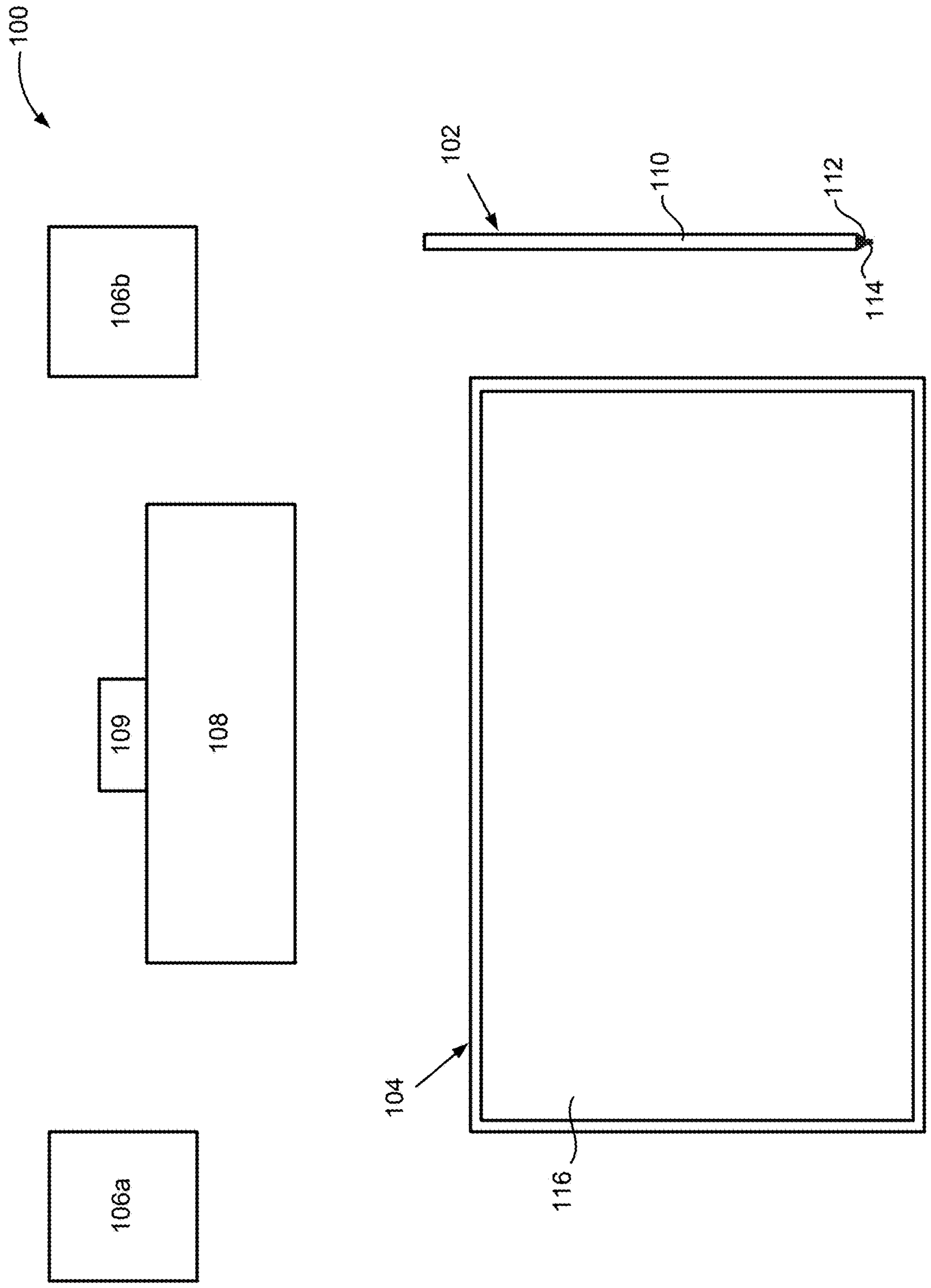
FIG. 1 shows a block diagram of a visualization system, according to one or more embodiments of the present disclosure.

FIG. 1 shows a block diagram of a visualization system 100, according to one or more embodiments of the present disclosure. The visualization system 100 includes a position indicator 102, a processing device 104, a plurality of tracking devices 106*a* and 106*b*, a visualization device 108, and a sensor 109.

In the illustrated embodiment, the position indicator 102 includes a hollow, generally cylindrical case 110 having an opening 112 formed at one end thereof, though the case of the position indicator 102 may have other, different forms. A tip of a core body 114 protrudes from the case 110 through the opening 112. In one or more embodiments, the core body 114 is a rod-shaped member that transmits pressure corresponding to a pressure applied to a part of the position indicator (e.g., tip of a core body 114), to a pressure detector 118, which will be described below with reference to FIG. 2. In one or more embodiments, the core body 114 is formed of an electrically-conductive material. In one or more embodiments, the core body 114 is non-conductive and is formed from resin.

Alternatively or in combination, in one or more embodiments, the opening 112 is formed in a side surface of the case 110, and the core body 114 extends through the opening 112 thereby enabling a finger of a user to apply pressure to the core body in order to provide input to the processing device 104. As will be explained below with reference to FIG. 2, the position indicator 102 transmits to the processing device 104 a signal that is indicative of an amount of pressure applied to the tip of the core body 114. The position indicator 102 can be used as an input device for the processing device 104.

The processing device 104 includes an input surface 116, for example, which is formed from a transparent material such as glass. In one or more embodiments, the processing device 104 is a tablet computer. As will be explained below with reference to FIG. 3, a sensor 140 that tracks the current position of the position indicator 102 and a display device 138 may be disposed below the input surface 116. The processing device 104 generates visualization data based on operation of the position indicator 102 by a user, and transmits the visualization data to the visualization device 108, which displays images based on the visualization data. Additionally or alternatively, the display device 138 of the processing device 104 may display images based on the visualization data.

In one or more embodiments, the visualization device 108 and the display device 138 each process portions of the visualization data generated by the processing device 104 and simultaneously display images. In one or more embodiments, the visualization device 108 and the display device 138 operate with different screen refresh rates. Accordingly, it may be desirable offload processing of the device operating at the higher screen refresh rate to the device operating at the lower screen refresh rate. For example, the visualization device 108 may operate with a screen refresh rate of 90 Hz and the display device 138 may operate with a screen refresh rate of 60 Hz, and in such case it may be desirable to offload some or all of the processing of visualization data by the visualization device 108 to the display device 138. Thus, the processing device 104 may partition the visualization data such that a processing load of the visualization device 108 is offloaded to the display device 138.

In one or more embodiments, the processing device 104 receives from the visualization device 108 a signal indicative of a current processing load of the visualization device 108, and the processing device 104 dynamically adjusts the amount of visualization data transmitted to the visualization device 108 and the display device 138 based on the current processing load. In one or more embodiments, the processing device 104 estimates the current processing load of the visualization device 108, and dynamically adjusts the amount of visualization data transmitted to the visualization device 108 and the display device 138 based on the estimated current processing load. For example, if the indicated or estimated current processing load of the visualization device 108 is greater than or equal to a predetermined threshold value, the processing device 104 decreases the amount of visualization data that is transmitted to the visualization device 108 and increases the amount of visualization data that is transmitted to the display device 138. Additionally or alternatively, the processing device 104 may offload processing from the display device 138 to the visualization device 108 in a similar manner.

The tracking devices 106*a* and 106*b* track the position and/or orientation of the position indicator 102, and particularly, in some embodiments, the tip of the core body 114 of the position indicator 102. The tracking devices 106*a* and 106*b* are collectively referred to herein as tracking devices 106. Although the embodiment shown in FIG. 1 includes two tracking devices 106, the visualization system 100 may include a different number of tracking devices 106 without departing from the scope of the present disclosure. For example, the visualization system 100 may include three, four, or more tracking devices 106 according to the present disclosure. In one or more embodiments, the visualization system 100 does not include any tracking devices 106, and the position of the tip of the core body 114 of the position indicator 102 is tracked using only the sensor 140 of the processing device 104.

In one or more embodiments, the tracking devices 106 employ known optical motion tracking technologies in order to track the position and/or orientation of the tip of the core body 114 of the position indicator 102. In one or more embodiments, the position indicator 102 has reference tags in the form of optical markers mounted on an exterior surface of the case 110, wherein the optical markers are passive devices each having a unique, visually distinct color or pattern formed thereon that can be optically sensed. Each of the tracking devices 106 may include a camera that obtains images of one or more of the optical markers and transmits corresponding image data to the processing device 104. The processing device 104 stores data indicative of a spatial relationship between each of the optical markers and the tip of the core body 114 of the position indicator 102, and determines a current position and/or orientation of the tip of the core body 114 of the position indicator 102 by processing the image data according to known techniques. In one or more embodiments, the optical markers are active devices each having a light emitting device (e.g., light emitting diode) that emits light having a different wavelength. In one or more embodiments, the tracking devices 106 are Constellation sensors, which are part of the Oculus Rift system available from Oculus VR. In one or more embodiments, the tracking devices 106 are laser-based tracking devices. For example, the tracking devices 106 are SteamVR 2.0 Base Stations, which are part of the HTC Vive system available from HTC Corporation.

The visualization device 108 processes the visualization data that is generated by the processing device 104, and displays corresponding images. In one or more embodiments, the visualization device 108 is a head-mounted display device. In one or more embodiments, the visualization device 108 is an HTC Vive Pro virtual reality headset, which is part of the HTC Vive system available from HTC Corporation. In one or more embodiments, the visualization device 108 is an Oculus Rift virtual reality headset, which is part of the Oculus Rift system available from Oculus VR. In one or more embodiments, the visualization device 108 is a HoloLens augmented reality headset available from Microsoft Corporation.

In one or more embodiments, the visualization device 108 includes the sensor 109, which is used to track the location of physical objects within a field of view of the sensor 109. For example, the visualization device 108 is a head-mounted display and the sensor 109 includes a pair of cameras, wherein each camera is located near one eye of a user of the visualization device 108 and has a field of view that is substantially the same as that eye. Additionally, the visualization device 108 includes a transmitter that transmits image data corresponding to the images captured by the cameras to the processing device 104, which processes the image data and determines coordinates for objects imaged by the cameras, for example, using conventional image processing techniques. For example, in one or more embodiments, the processing device 104 includes object recognition software that is configured in a manner similar to the object recognition engine described in U.S. Patent Application Publication No. 2012/0206452, see e.g., paragraph 87, which is incorporated by reference herein in its entirety. Alternatively, the visualization device 108 includes a processor and a memory storing instructions that, when executed by the processor, cause the visualization device 108 to determine coordinates for objects imaged by the cameras and transmit those coordinates to the processing device 104.

Figure 2:
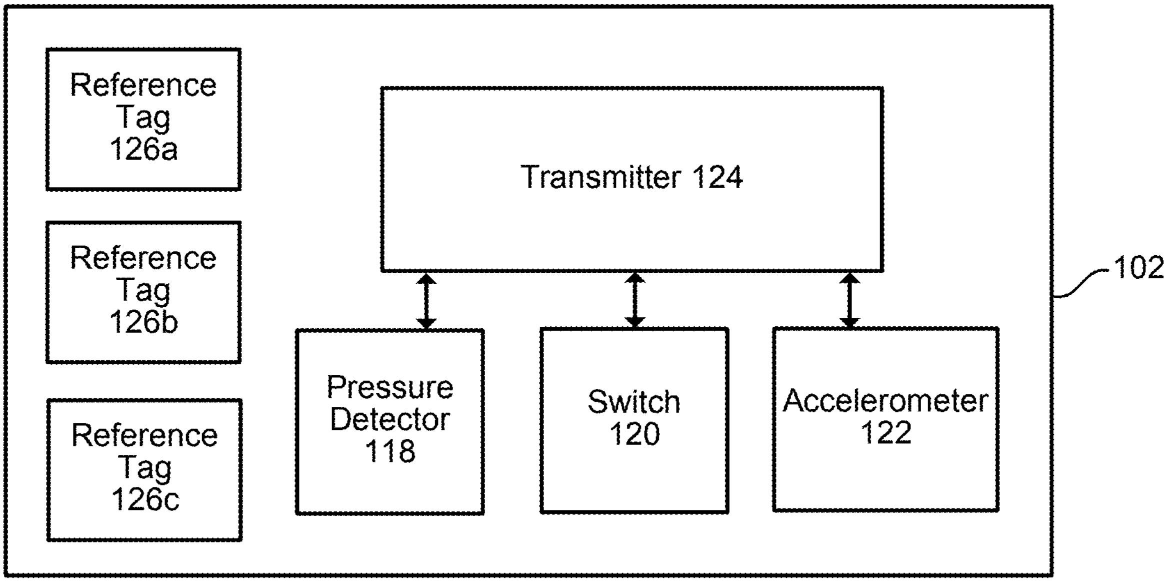
FIG. 2 shows a block diagram of a position indicator that is used as an input device, according to one or more embodiments of the present disclosure.

Having provided an overview of the visualization system 100, the position indicator 102 will now be described in greater detail with reference to FIG. 2, which shows a block diagram of the position indicator 102, according to one or more embodiments of the present disclosure. The position indicator 102 includes a pressure detector 118 which, in operation, detects a pressure applied to the tip of the core body 114, for example, when a user presses the tip of the core body 114 against the input surface 116 of the processing device 104. In one or more embodiments, the pressure detector 118 is configured in a manner similar to the pressure sensing component described in U.S. Pat. No. 9,939,931, see e.g., column 13, line 49, to column 22, line 13, which is incorporated by reference herein in its entirety.

In one or more embodiments, the position indicator 102 includes a switch 120 which in operation, is in one of a plurality of positions. A user can actuate the switch 120 to change the position of the switch 120 in order to provide input to the processing device 104. For example, the switch 120 is in a "closed" or "on" position while a user depresses it, and is in an "open" or "off" position while the user does not depress it. In one or more embodiments, the switch 120 is configured in a manner similar to the side switch described in U.S. Pat. No. 9,939,931, see e.g., column 11, lines 24-49. In one or more embodiments, the position indicator 102 includes two switches 120 that a user can operate to provide input similar to the input provided by operating a left button and a right button of a computer mouse.

In one or more embodiments, the position indicator 102 includes an accelerometer 122 which, in operation, outputs a signal indicative of an acceleration of the position indicator 102. In one or more embodiments, the accelerometer 122 is configured as a micro-machined microelectromechanical system (MEMS).

The position indicator 102 also includes a transmitter 124 coupled to the pressure detector 118, and the transmitter 124, in operation, transmits a signal indicative of the pressure applied to the tip of the core body 114 that is detected by the pressure detector 118. In one or more embodiments, the transmitter 124 operates in accordance with one or more of the Bluetooth communication standards. In one or more embodiments, the transmitter 124 operates in accordance with one or more of the IEEE 802.11 family of communication standards. In one or more embodiments, the transmitter 124 electromagnetically induces the signal via the tip of the core body 114 and the sensor 140 of the processing device 104. In one or more embodiments, the transmitter 124 is coupled to the switch 120, and the transmitter 124, in operation, transmits a signal indicative of the position of the switch 120. In one or more embodiments, the transmitter 124 is coupled to the accelerometer 122, and the transmitter 124, in operation, transmits a signal indicative of the acceleration of the processing device 102 that is detected by the accelerometer 122.

In one or more embodiments, the position indicator 102 includes a plurality of reference tags 126*a*, 126*b*, and 126*c*. The reference tags 126*a*, 126*b*, and 126*c* are collectively referred to herein as reference tags 126. The reference tags 126 are tracked by the tracking devices 106. In one or more embodiments, the reference tags 126 are passive optical markers that are secured to an exterior surface of the case 110 of the position indicator 102, as described above in connection with FIG. 1. Alternatively or in addition, in one or more embodiments, the reference tags 126 actively emit light or radio waves that are detected by the tracking devices 106. Although the embodiment shown in FIG. 2 includes three reference tags 126, the position indicator 102 may include a different number of reference tags 126. For example, the position indicator 102 may include four, five, six, or more reference tags 126 according to the present disclosure.

Figure 3:
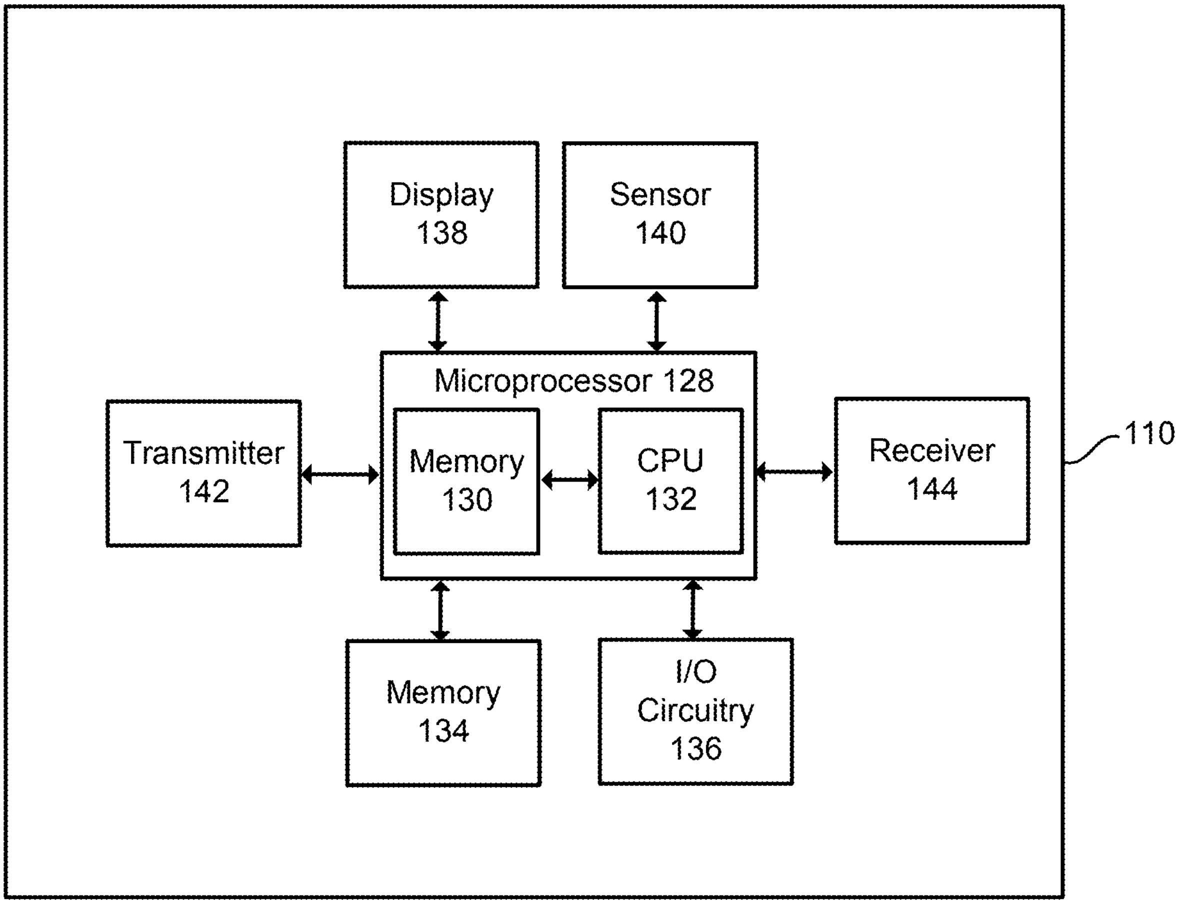
FIG. 3 shows a block diagram of a processing device that receives input via the position indicator shown in FIG. 2, according to one or more embodiments of the present disclosure.

Having described the position indicator 102 in greater detail, the processing device 104 will now be described in greater detail with reference to FIG. 3, which shows a block diagram of the processing device 104, according to one or more embodiments of the present disclosure. The processing device 104 includes a microprocessor 128 having a memory 130 and a central processing unit (CPU) 132, a memory 134, input/output (I/O) circuitry 136, a display device 138, a sensor 140, a transmitter 142, and a receiver 144.

The memory 134 stores processor-executable instructions that, when executed by the CPU 132, cause the processing device 104 to perform the acts of the processing device 104 described in connection with FIGS. 4, 6A, 6B, and 7. The CPU 132 uses the memory 130 as a working memory while executing the instructions. In one or more embodiments, the memory 130 is comprised of one or more random access memory (RAM) modules and/or one or more non-volatile random access memory (NVRAM) modules, such as electronically erasable programmable read-only memory (EEPROM) or Flash memory modules, for example.

In one or more embodiments, the I/O circuitry 136 may include buttons, switches, dials, knobs, microphones, or other user-interface elements for inputting commands to the processing device 104. The I/O circuitry 136 also may include one or more speakers, one or more light emitting devices, or other user-interface elements for outputting information or indications from the processing device 104.

The display device 138 graphically displays information to an operator. The microprocessor 128 controls the display device 138 to display information based on visualization data generated by the processing device 104. In one or more embodiments, the display device 138 is a liquid crystal display (LCD) device. In one or more embodiments, the display device 138 simultaneously displays two images so that users wearing appropriate eyewear can perceive a multidimensional image, for example, in a manner similar to viewing three-dimensional (3D) images via 3D capable televisions.

The sensor 140 detects the position indicator 102 and outputs a signal indicative of a position of the position indicator 102 with respect to an input surface (e.g., surface 116) of the sensor 140. In one or more embodiments, the microprocessor 128 processes signals received from the sensor 140 and obtains (X, Y) coordinates on the input surface of the sensor 140 corresponding to the position indicated by the position indicator 102. In one or more embodiments, the microprocessor 128 processes signals received from the sensor 140 and obtains (X, Y) coordinates on the input surface of the sensor 140 corresponding to the position indicated by the position indicator 102 in addition to a height (e.g., Z coordinate) above the input surface of the sensor 140 at which the position indicator 102 is located. In one or more embodiments, the sensor 140 is an induction type of sensor that is configured in a manner similar to the position detection sensor described in U.S. Pat. No. 9,964,395, see e.g., column 7, line 35, to column 10, line 27, which is incorporated by reference herein in its entirety. In one or more embodiments, the sensor 140 is a capacitive type of sensor that is configured in a manner similar to the position detecting sensor described in U.S. Pat. No. 9,600,096, see e.g., column 6, line 5, to column 8, line 17, which is incorporated by reference herein in its entirety.

The transmitter 142 is coupled to the microprocessor 128, and the transmitter 142, in operation, transmits visualization data generated by the microprocessor 128 to the visualization device 108. For example, in one or more embodiments, the transmitter 142 operates in accordance with one or more of the Bluetooth and/or IEEE 802.11 family of communication standards. The receiver 144 is coupled to the microprocessor 128, and the receiver 144, in operation, receives signals from the tracking devices 106 and the visualization device 108. For example, in one or more embodiments, the receiver 144 operates in accordance with one or more of the Bluetooth and/or IEEE 802.11 family of communication standards. In one or more embodiments, the receiver 144 receives signals from the position indicator 102. In one or more embodiments, the receiver 144 is included in the sensor 140 and receives one or more signals from the tip of the core body 114 of the position indicator 102 by electromagnetic induction.

Figure 4:
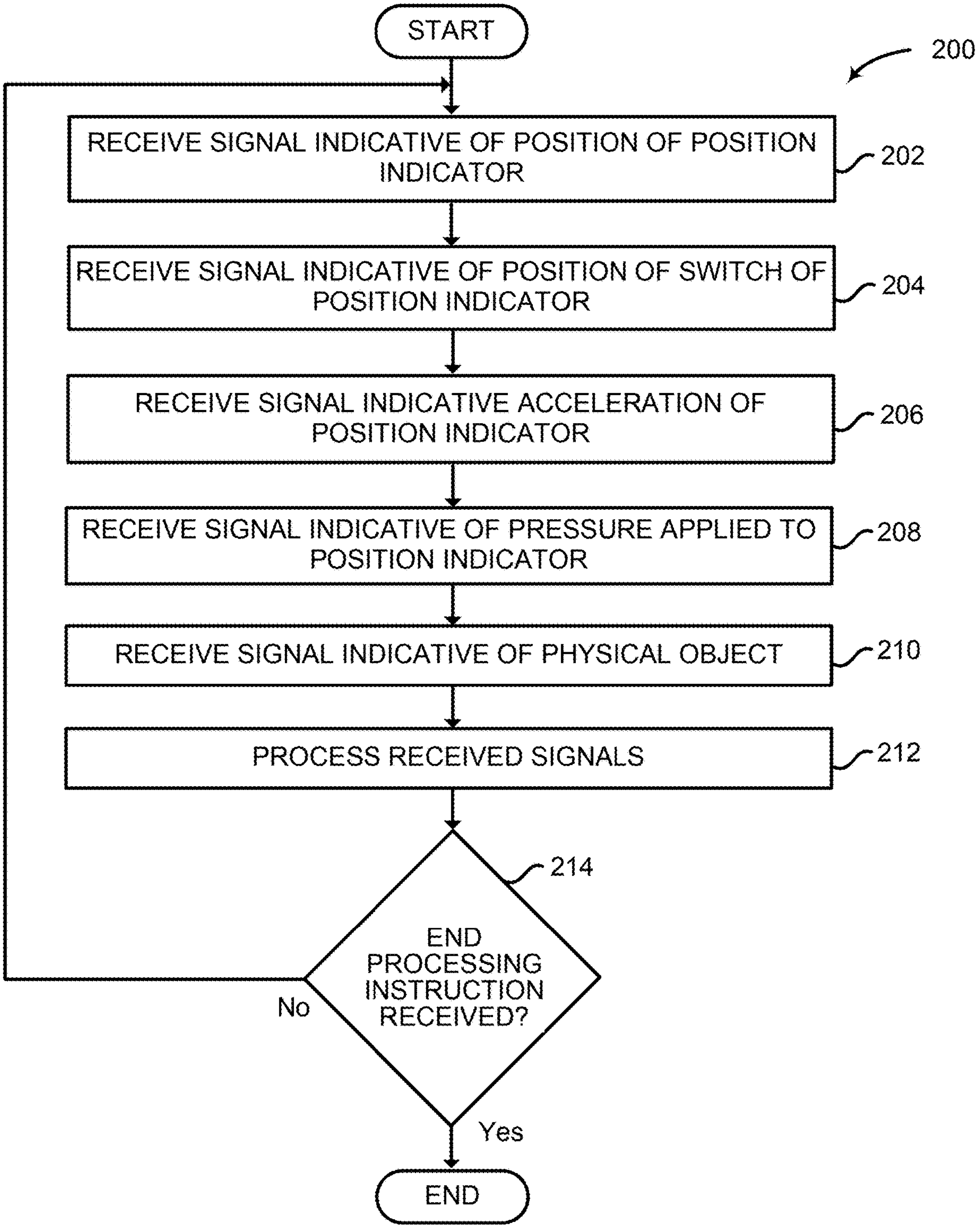
FIG. 4 shows a flowchart of a method that may be performed by the visualization system shown in FIG. 1, according to one or more embodiments of the present disclosure.

Having described the structure of the visualization system 100, an example of a method 200 performed by the visualization system 100 will now be described in connection with FIG. 4, which shows a flowchart of the method 200, according to one or more embodiments of the present disclosure. The method 200 begins at 202, for example, upon powering on the processing device 104.

At 202, one or more signals indicative of one or more positions of the position indicator 102 are received. For example, the receiver 144 of the processing device 104 receives one or more signals from the tracking devices 106. Additionally or alternatively, the microprocessor 128 receives one or more signals from the sensor 140 of the processing device 104. The method 200 then proceeds to 204.

At 204, a signal indicative of the position of the switch 120 of the position indicator 102 is received. For example, the receiver 144 of the processing device 104 receives the signal indicative of the position of the switch 120 from the transmitter 124 of the position indicator 102. The method 200 then proceeds to 206.

Optionally, at 206, a signal indicative of the acceleration of the position indicator 102 is received. For example, the receiver 144 of the processing device 104 receives the signal indicative of the acceleration of the position indicator 102 from the transmitter 124 of the position indicator 102. The method 200 then proceeds to 208.

At 208, a signal indicative of the pressure applied to the tip of the core body 114 is received. For example, the receiver 144 of the processing device 104 receives the signal indicative of the pressure applied to the tip of the core body 114 from the transmitter 124 of the position indicator 102. Additionally or alternatively, the sensor 140 of the processing device 104 receives the signal indicative of the pressure applied to the tip of the core body 114 from the tip of the core body 114 of the position indicator 102 by electromagnetic induction. The method 200 then proceeds to 210.

At 210, one or more signals indicative of one or more physical objects that are located in the vicinity of a user of the visualization system 100 are received. In one or more embodiments, the receiver 144 of the processing device 104 receives the signals indicative of the one or more physical objects that are located in the vicinity of the user from the sensor 109 of the visualization device 108. For example, the receiver 144 receives image data generated by a pair of cameras of the sensor 109, and the microprocessor 128 processes the image data and obtains coordinates corresponding to exterior surfaces of objects imaged by the cameras. The method 200 then proceeds to 212.

At 212, the signals received at 202, 204, 206, 208, and 210 are processed. In one or more embodiments, data transmitted by those signals are timestamped and stored in the memory 130 of the processing device 104, and the CPU 132 processes the data in chronological order based on timestamps associated with the data. Processing corresponding to the flowchart shown in FIG. 5 may be performed at 212, as will be explained below. The method 200 then proceeds to 214.

At 214, a determination is made whether an end processing instruction has been received. For example, the microprocessor 128 determines whether the position indicator 102 has been used to select a predetermined icon or object that is displayed by the display device 138 of the processing device 104. By way of another example, the microprocessor 128 determines whether a voice command corresponding to the end operation has been received at 214. If a determination is made that the end operation has been received at 214, the method 200 ends. If not, the method 200 returns to 202.

Figure 5:
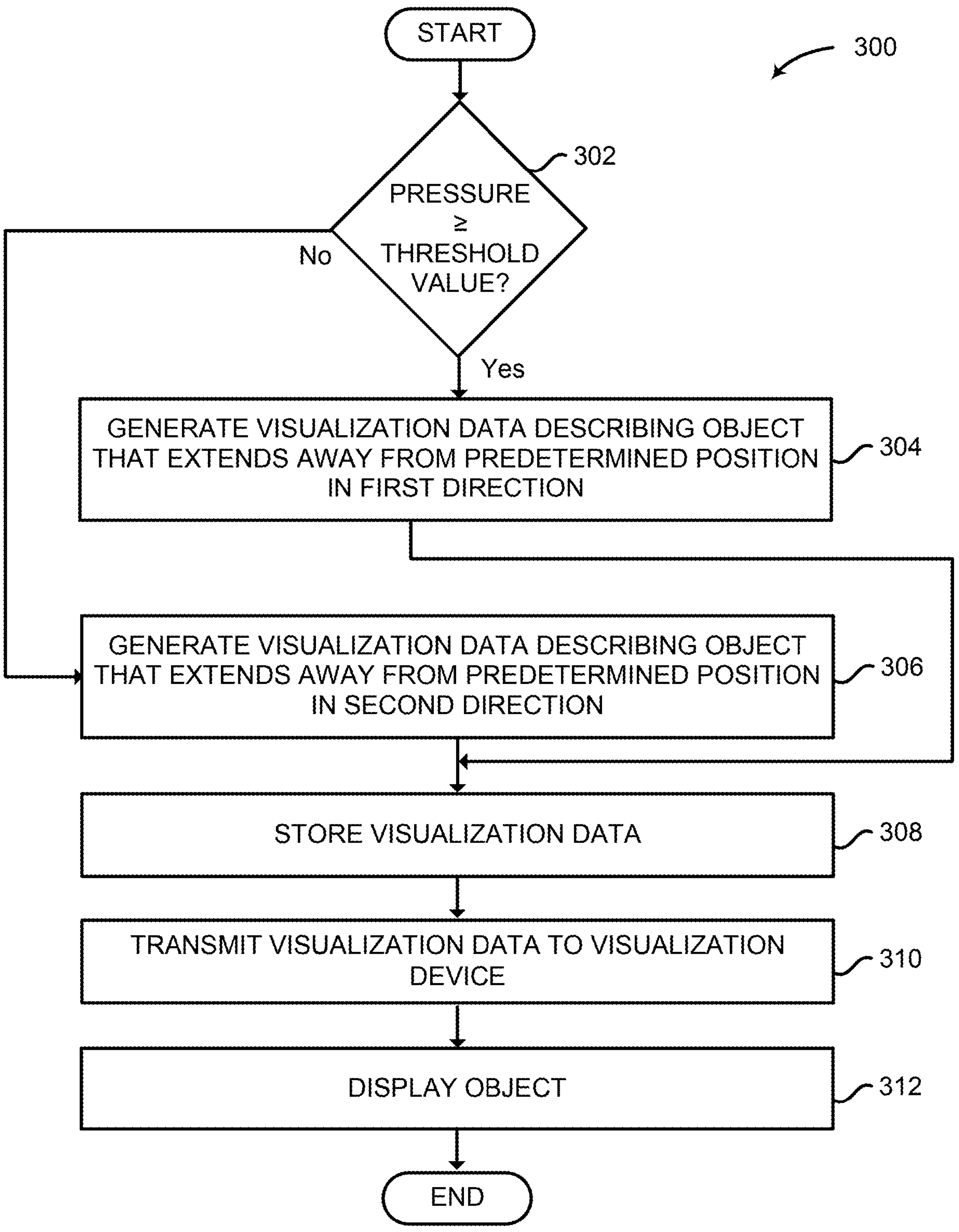
FIG. 5 shows a flowchart of a method that may be performed by the visualization system shown in FIG. 1, according to one or more embodiments of the present disclosure.

FIG. 5 shows a flowchart of a method 300 that may be performed by the visualization system 100 at 212 of the method 200 described above, according to one or more embodiments of the present disclosure. The method 300 provides a "extrusion" operation that results in a particular visual display, as will be described. The method 300 begins at 302 in response to the microprocessor 128 determining that an instruction to perform an extrusion operation has been received. For example, the microprocessor 128 determines that the position indicator 102 has been used to select a predetermined icon or object that is displayed by the display device 138 of the processing device 104. By way of another example, the method 300 begins at 302 in response to the microprocessor 128 determining that a voice command corresponding to the instruction to perform the extrusion operation has been received.

At 302, the pressure applied to the tip of the core body 114 is compared to a threshold pressure value. In the illustrated embodiment, a determination is made whether the pressure applied to the tip of the core body 114 is greater than or equal to a threshold pressure value. For example, the memory 134 stores a predetermined threshold pressure value, and the microprocessor 128 determines whether the pressure applied to the tip of the core body 114 indicated by the signal received at 208 of the method 200 described above is greater than or equal to the threshold pressure value. If the pressure applied to the tip of the core body 114 is determined to be greater than or equal to the threshold pressure value at 302, the method 300 proceeds to 304. If not, the method 300 proceeds to 306.

In one or more embodiments, a user may indicate to the processing device 104 that the extrusion operation is to be performed by relatively slowly lifting the tip of the core body 114 away from the from input surface 116 of the processing device 104, as opposed to relatively quickly lifting the position indication 102 from the input surface 116 in order to perform an another input operation on a different part of the input surface 106. Accordingly, at 302 of the method 300, an additional determination may be made regarding whether the acceleration of the position indicator 102 is less than a threshold acceleration value. For example, the memory 134 stores a predetermined threshold acceleration value, and the microprocessor 128 determines whether the acceleration of the position indicator 102 indicated by the signal received at 206 of the method 200 described above is greater than zero and less than or equal to the threshold acceleration value. If the acceleration of the position indicator 102 is not determined to be greater than zero and less than or equal to the threshold acceleration value at 302 (and the pressure applied to the tip of the core body 114 is determined to be greater than or equal to the threshold pressure value), the method 300 proceeds to 304. If not, the method 300 proceeds to 306.

At 304, visualization data are generated describing an object that extends away from a predetermined position in a first direction. For example, the predetermined position corresponds to a plane having a Z coordinate of zero such as the input surface 116 of the processing device 104, and the first direction corresponds to increasing negative Z coordinate values orthogonal to the plane of the input surface 116. The method 300 then proceeds to 308.

At 306, visualization data are generated describing an object that extends away from a predetermined position in a second direction. For example, the predetermined position corresponds to a plane having a Z coordinate of zero such as the input surface 116 of the processing device 104, and the second direction corresponds to increasing positive Z coordinate values orthogonal to the plane of the input surface 116. The method 300 then proceeds to 308.

At 308, the visualization data generated at 304 or 306 are stored. For example, the microprocessor 128 of the processing device 104 causes the visualization data to be stored in the memory 134. The method 300 then proceeds to 310.

At 310, the visualization data generated at 304 or 306 are transmitted. In one or more embodiments, the microprocessor 128 of the processing device 104 causes the transmitter 142 to transmit the visualization data to the visualization device 108. In one or more embodiments, the microprocessor 128 transmits the visualization data to the display device 138 of the processing device 104. The method 300 then proceeds to 312.

At 312, the visualization data are processed and the object is displayed based on the visualization data. In one or more embodiments, the visualization device 108 performs rendering of two-dimensional images to obtain a three-dimensional (3D) representation of the object described by the visualization data. In one or more embodiments, the visualization device 108 performs rendering of two-dimensional images to obtain a two-and-one-half-dimensional (2.5D) representation of the object described by the visualization data, wherein a 3D environment of an observer viewing the output of the visualization device 108 is projected onto 2D planes of the retinas of the observer. In one or more embodiments, the microprocessor 128 causes the display device 138 of the processing device 104 to render the visualization data and display the object. The method 300 then ends.

Figure 6A:
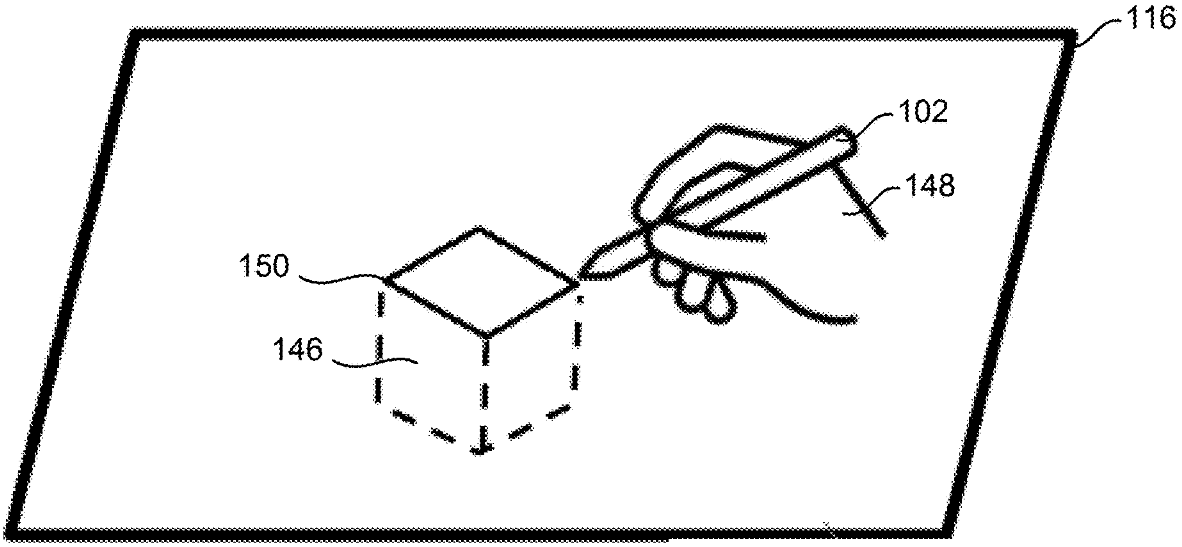
FIG. 6A shows a perspective view of an object that may be displayed by the visualization system shown in FIG. 1.
Figure 6B:
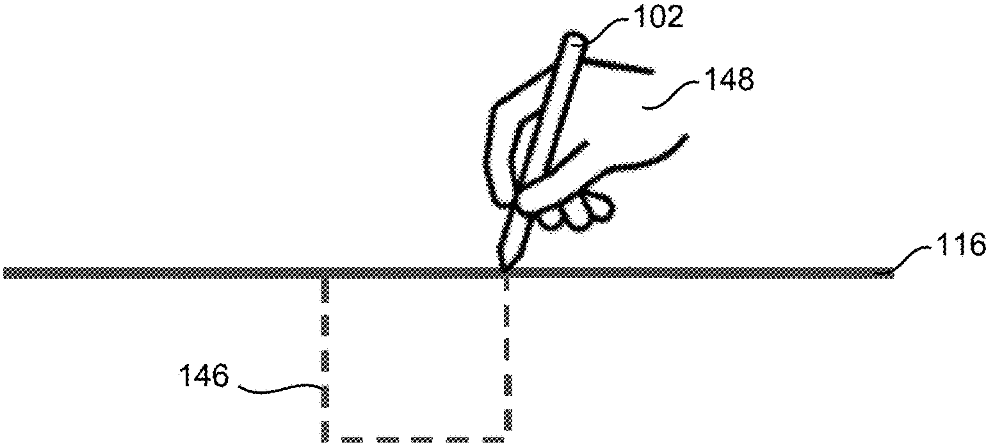
FIG. 6B shows a side view of the object shown in FIG. 6A, according to one or more embodiments of the present disclosure.

FIG. 6A shows a perspective view of an object 146 that may be displayed at 312 of the method 300, according to one or more embodiments of the present disclosure. FIG. 6B shows a side view of the object 146 shown in FIG. 6A.

In the illustrated example, assume a hand 148 of a user of the visualization system 100 holds the position indicator 102 and traces an outline of a square shape 150 on the input surface 116 of the processing device 104 using the tip of the core body 114. The processing device 104 receives one or more signals indicative of the corresponding positions of the position indicator 102 at 202 of the method 200 described above. Also, assume the user indicates to the processing device 104 that an extrusion operation is to be performed based on the shape 150 by keeping the position indicator 102 disposed over the outline of the shape 150 while moving the switch 120 of the position indicator 102 to the closed or on position. The processing device 104 receives a signal indicative of the position of the switch 120 at 204 of the method 200 described above. Additionally, assume the user indicates a direction in which the extrusion operation is to be performed by pressing the tip of the core body 114 downwardly against the input surface 116 of the processing device 104. The processing device 104 receives a signal indicative of the pressure applied to the tip of the core body 114 at 208 of the method 200 described above.

In addition, assume that, because the pressure applied to the tip of the core body 114 is determined to be greater than or equal to the threshold value at 302 of the method 300 described above, the processing device 104 generates visualization data with the object 146 extending downwardly from a plane corresponding to the input surface 116 of the processing device 104 in a direction that is away from the user at 304 of the method 300 described above. The extent to which the object 146 extends downwardly is based on the magnitude of the pressure applied to the tip of the core body 114 and/or the amount of time the user causes pressure to be applied to the tip of the core body 114. That is, the more pressure the user causes to be applied to the tip of the core body 114, the greater the distance the object 146 extends downwardly. Similarly, the longer the user causes the pressure to be applied to the tip of the core body 114, the greater the distance the object 146 extends downwardly.

For example, assume the input surface 116 corresponds to a Z coordinate of zero, Z coordinates increase with increasing distance above the input surface 116, and the Z coordinates decrease with increasing distance below the input surface. Also, assume the microprocessor 128 generates coordinates for the object 146 such that the X and Y coordinates of the object 146 correspond to respective X and Y coordinates of the shape 150, and the Z coordinates of the object 146 range from zero to a negative value corresponding to the magnitude of the pressure applied to the tip of the core body 114. Accordingly, when the visualization data generated by the processing device 104 at 304 of the method 300 described above are displayed by the visualization device 108 at 312 of the method 300 described above, the object 146 is displayed extending downwardly from a surface corresponding to the input surface 116 of the processing device 104 in the direction that is away from the user, as shown in FIG. 6B.

Figure 7A:
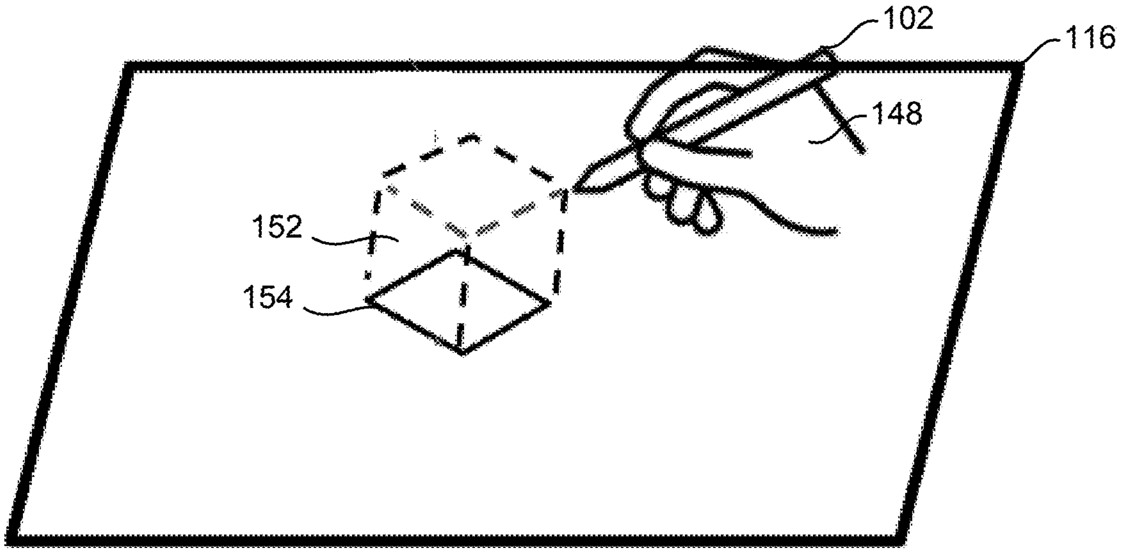
FIG. 7A shows a perspective view of an object that may be displayed by the visualization system shown in FIG. 1.
Figure 7B:
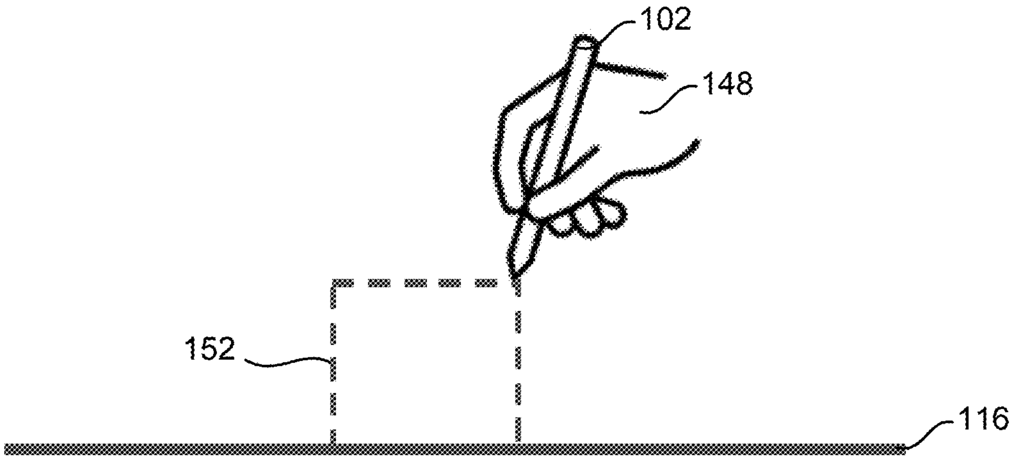
FIG. 7B shows a side view of the object shown in FIG. 7A, according to one or more embodiments of the present disclosure.

FIG. 7A shows a perspective view of an object 152 that may be displayed at 312 of the method 300 described above, according to one or more embodiments of the present disclosure. FIG. 7B shows a side view of the object 152 shown in FIG. 7A.

In the illustrated example, assume the hand 148 of the user of the visualization system 100 holds the position indicator 102 and traces an outline of a square shape 154 on the input surface 116 of the processing device 104 using the tip of the core body 114. The processing device 104 receives one or more signals indicative of the corresponding positions of the position indicator 102 at 202 of the method 200 described above. Further, assume the user indicates to the processing device 104 that an extrusion operation is to be performed based on the shape 154 by keeping the position indicator 102 disposed over the outline of the shape 154 while moving the switch 120 of the position indicator 102 from the open or off position to the closed or on position. The processing device 104 receives a signal indicative of the position of the switch 120 at 204 of the method 200 described above.

Additionally or alternatively, assume the user indicates to the processing device 104 that the extrusion operation is to be performed by relatively slowly moving the tip of the core body 114 upwardly away from the input surface 116 of the processing device 104. The processing device 104 receives a signal indicative of the acceleration of the position indication 102 at 206 of the method 200 described above. In addition, assume that, because the acceleration of the position indication 102 is determined to be greater than zero and less than or equal to the threshold acceleration value and the pressure applied to the tip of the core body 114 is not determined to be greater than or equal to the threshold pressure value at 302 of the method 300 described above, the processing device 104 generates visualization data with the object 152 extending upwardly from a plane corresponding to the input surface 116 of the processing device 104 in a direction that is toward the user at 306 of the method 300 described above. The extent to which the object 152 extends upwardly is based on the magnitude of the distance between the tip of the core body 114 and the input surface 116 of the processing device 104. That is, the greater the distance between the tip of the core body 114 and the input surface 116 of the processing device 104, the greater the distance the object 152 extends upwardly.

For example, once again assume the input surface 116 corresponds to a Z coordinate of zero, the Z coordinates increase with increasing distance above the input surface 116, and the Z coordinates decrease with increasing distance below the input surface. Also, assume the microprocessor 128 generates coordinates for the object 152 such that the X and Y coordinates of the object 152 correspond to respective X and Y coordinates of the shape 154, and the Z coordinates of the object 152 range from zero to a positive value corresponding to the distance between the tip of the core body 114 and the input surface 116 of the processing device 104. Accordingly, when the visualization data generated by the processing device 104 at 306 of the method 300 described above are displayed by the visualization device 108 at 312 of the method 300 described above, the object 152 is displayed extending upwardly from a surface corresponding to the input surface 116 of the processing device 104 in the direction that is toward the user, as shown in FIG. 7B.

With the present invention, the user is able to intuitively specify shapes, orientations, dimensions, etc. of an object in digital data, and render the object with a multidimensional appearance, above or below the plane of an input surface, using a single input device as described.

The various embodiments described above can be combined to provide further embodiments. Aspects of the embodiments can be modified, if necessary to employ concepts of the various patents referred to this this specification to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for displaying a three-dimensional object based on user operation of a position indicator, the method comprising:

defining a two-dimensional shape based on movement of a tip of the position indicator on an input surface;

determining a direction in which the two-dimensional shape extends, based on at least one of a pressure applied to the input surface by the position indicator or an acceleration of the position indicator;

generating a representation of a three-dimensional object extruded from the two-dimensional shape in the direction in which the two-dimensional shape is determined to extend; and displaying the three-dimensional object on a display.

2. The method of claim 1, further comprising:

determining a distance by which the three-dimensional object extends from the two-dimensional shape based on a magnitude of the pressure applied to the input surface by the position indicator.

3. The method of claim 1, further comprising:

determining a distance by which the three-dimensional object extends from the two-dimensional shape based on a duration for which the pressure is applied to the input surface by the position indicator.

4. The method of claim 1, wherein the direction in which the two-dimensional shape extends is an upward direction away from the input surface when the pressure applied to the input surface by the position indicator is less than a predetermined threshold and the acceleration of the position indicator is within a predetermined range.

5. The method of claim 1, further comprising:

initiating extrusion of the three-dimensional object, wherein the initiating includes detecting a change in a position of a switch of the position indicator.

6. The method of claim 1, further comprising:

tracking the movement of the tip of the position indicator on the input surface by a sensor disposed beneath the input surface.

7. The method of claim 1, further comprising:

tracking the movement of the position indicator using one or more reference tags disposed on an exterior surface of the position indicator and one or more tracking devices configured to detect the reference tags.

* * * * *